(12) United States Patent
Khubani et al.

(10) Patent No.: US 10,455,996 B1
(45) Date of Patent: Oct. 29, 2019

(54) GLASS CLEANING DEVICE

(71) Applicant: DaVinci II CSJ, LLC, Fairfield, NJ (US)

(72) Inventors: Ajit Khubani, Saddle River, NJ (US); Damian Mucaro, Hackensack, NJ (US)

(73) Assignee: DaVinci II CSJ, LLC, Fairfield, NJ (US)

( * ) Notice: Subject to any disclaimer, the term of this patent is extended or adjusted under 35 U.S.C. 154(b) by 0 days.

(21) Appl. No.: 16/291,885

(22) Filed: Mar. 4, 2019

(51) Int. Cl.
| A47L 1/15 | (2006.01) |
| A47L 1/08 | (2006.01) |
| A47L 1/06 | (2006.01) |
| B25G 1/06 | (2006.01) |
| B60S 3/04 | (2006.01) |
| B05C 17/005 | (2006.01) |

(52) U.S. Cl.
CPC .............. A47L 1/15 (2013.01); A47L 1/06 (2013.01); A47L 1/08 (2013.01); B05C 17/00569 (2013.01); B25G 1/06 (2013.01); B60S 3/047 (2013.01)

(58) Field of Classification Search
CPC .......... B05C 1/00; B05C 5/00; B05C 5/0233; B05C 17/005; B05C 17/00569; A47L 1/00; A47L 1/06; A47L 1/08; A47L 1/15; A47L 13/16; A47L 13/22; A46B 11/001; A46B 11/002; B25G 1/06; B60S 3/047
See application file for complete search history.

(56) References Cited

U.S. PATENT DOCUMENTS

| 3,782,837 | A | * | 1/1974 | Feldmann | A46B 7/02 401/281 |
| 3,889,717 | A | * | 6/1975 | Obadal | F16L 11/10 138/110 |
| D265,858 | S | | 8/1982 | Spirk | |
| D316,318 | S | | 4/1991 | Cheang | |
| D386,852 | S | | 11/1997 | Viner et al. | |
| D480,189 | S | | 9/2003 | Libman et al. | |
| D515,758 | S | | 2/2006 | Alexander et al. | |
| D554,815 | S | | 11/2007 | Richard et al. | |
| D632,857 | S | | 2/2011 | Sgroi et al. | |
| 8,360,668 | B1 | * | 1/2013 | Hinnant | A46B 5/0075 401/188 R |
| D715,058 | S | | 10/2014 | Roth et al. | |
| D753,354 | S | | 4/2016 | Casini | |
| 9,408,517 | B2 | | 8/2016 | Fitzpatrick | |
| D770,712 | S | | 11/2016 | Neumann | |
| 9,675,209 | B2 | | 6/2017 | Roth et al. | |
| D824,625 | S | | 7/2018 | Gooden | |
| 2008/0022473 | A1 | | 1/2008 | Risch | |

* cited by examiner

Primary Examiner — David J Walczak
(74) Attorney, Agent, or Firm — Cooper & Dunham LLP

(57) ABSTRACT

An exemplary glass cleaning device including a handle having a distal portion and a proximal portion, the proximal portion pivotally coupled to the distal portion so that the proximal portion can pivot between an extended position and a folded position, a spray head having a nozzle in fluid communication with a fluid reservoir, the fluid reservoir being disposed with the proximal portion of the handle and the nozzle being coupled to the distal portion of the handle, a button to activate the nozzle, the button being disposed on the proximal portion of the handle, and a plate coupled to the spray head.

19 Claims, 8 Drawing Sheets

GLASS CLEANING DEVICE

BACKGROUND

Cleaning glass can be difficult. It typically requires the use of at least a cleaning solution and a clean cloth. However, improper cleaning of the glass can lead to streaks that can cause the glass to not appear clean. Further adding to the difficulty is that any inadvertent touching of the glass can lead to smudges, finger prints, and streaks that can require the glass to be cleaned again. Also, certain glass that requires cleaning are often positioned or oriented in such a way that makes cleaning the glass difficult. For example, the angling and position of automotive windshields, including the positioning of the rearview mirror, can make cleaning, and even accessing, all of the windshield a difficult task.

SUMMARY

Exemplary embodiments of the present invention can provide a glass cleaning device. The exemplary glass cleaning device can include a handle having a distal portion and a proximal portion, the proximal portion pivotally coupled to the distal portion so that the proximal portion can pivot between an extended position and a folded position, a spray head having a nozzle in fluid communication with a fluid reservoir, the fluid reservoir being disposed with the proximal portion of the handle and the nozzle being coupled to the distal portion of the handle, a button to activate the nozzle, the button being disposed on the proximal portion of the handle, and a plate coupled to the spray head.

According to certain exemplary embodiments, the glass cleaning can include a joint at which the proximal portion and the distal portion are pivotally coupled. The joint can include an axle and a locking pin, the locking pin being receivable in an opening to provide releasable locking of the handle in the extended position.

According to certain exemplary embodiments, the glass cleaning device can further include a flexible conduit extending through the handle from the liquid reservoir to the spray head, the flexible conduit including a lumen to provide the fluid communication between the nozzle and the fluid reservoir. Further, the glass cleaning device can further include a reinforcing member disposed in the lumen of the flexible conduit adjacent to the joint to prevent the lumen from collapsing when the handle is in the folded position. The reinforcing member can include a spring.

According to certain exemplary embodiments, the plate can be rotatably coupled to the spray head, and the spray head can include at least one recess and the plate includes a spring-biased projection that engages with the at least one recess to allow the plate to be releasably secured, relative to the spray head, in a plurality of positions.

Another embodiment of the present invention can provide a glass cleaning device including a handle including a linkage providing a pivoting connection between a distal portion of the handle and a proximal portion of the handle, the pivoting connection allowing the distal portion to be pivoted relative to the proximal portion between an extended position and a folded position, a flexible conduit having a lumen extending through the handle to provide fluid communication between a nozzle and a fluid reservoir, a reinforcing member disposed within the lumen adjacent to the linkage to prevent the lumen from collapsing when the handle is in the folded position, and a button to activate the nozzle disposed on the proximal portion of the handle.

According to certain exemplary embodiments, the linkage can include an axle and a locking pin, and, in the extended position, the locking pin can be received in an opening to releasably secure the handle in the extended position. Further the locking pin can be depressable to disengage the locking pin from the opening to allow the proximal portion to pivot about the axle relative to the distal portion.

According to certain exemplary embodiments, the glass cleaning device can further include a plate designed and dimensioned to receive a cleaning accessory. Additionally, the reinforcing member can include a spring.

According to certain exemplary embodiments, the glass cleaning device can further a spray head, and the plate can be rotatably coupled to the spray head. Further, the spray head can include at least one recess and the plate includes a spring-biased projection that engages with the at least one recess to allow the plate to be releasably secured, relative to the spray head, in a plurality of positions.

According to certain exemplary embodiments, the nozzle can be positioned such that upon activation of the nozzle via the button, liquid contained within the liquid reservoir is urged to an area adjacent the plate.

BRIEF DESCRIPTION OF THE DRAWINGS

The features and advantages of the present invention can be more readily understood from the following detailed description with reference to the accompanying drawings, wherein.

DETAILED DESCRIPTION

Figure 1:
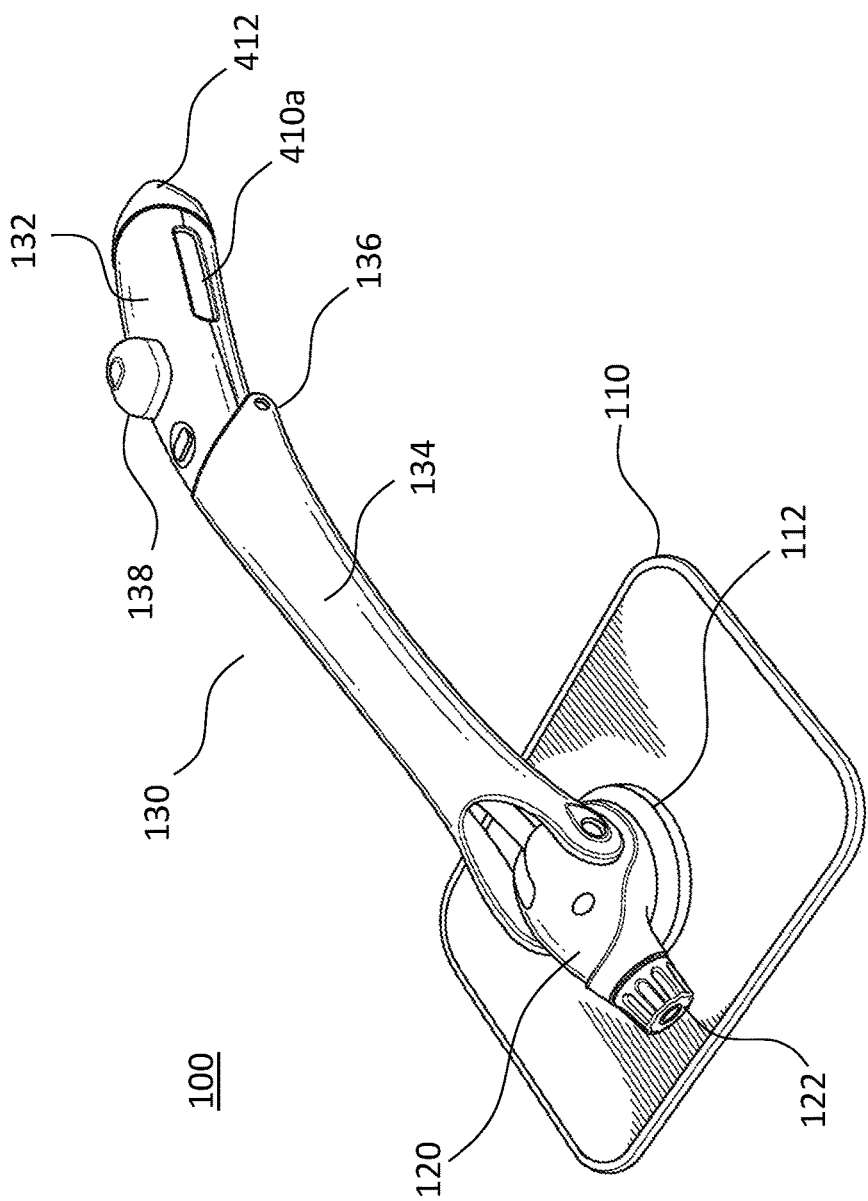
FIG. 1 is a top perspective view of an exemplary glass cleaning device according to an embodiment of the present invention.

Exemplary embodiments of the present invention are generally directed to a new and novel glass cleaning device. The exemplary glass cleaning device can provide a single device that includes a cleaning surface and can store and deliver cleaning solution for easy and convenient cleaning of glass. The exemplary glass cleaning can further provide a handle that can allow users to easily clean the glass, while also facilitating cleaning of difficult to access glass. Further, the handle can be folded to facilitate easy and compact storage of the device.

FIGS. 1-8 show an exemplary glass cleaning device 100 according to embodiments of the present invention. As shown in FIGS. 1-8, glass cleaning device 100 can include plate 110, spray head 120, elongated handle 130, and a spraying assembly (not shown). Plate 110 can be rotatably coupled to spray head 120 to allow plate 110 to be rotated relative spray head 120, and elongated handle 130 can be pivotally coupled to spray head 120 to allow handle pivot relative to relative to spray head 120. Plate 110 can be sized and dimensioned to receive a cleaning accessory, such as a cloth, rag, pad, etc. Glass cleaning device 100 can also employ a spraying assembly, which can include a reservoir, a trigger, and a nozzle, to spray a cleaning solution on the surface to be cleaned. For example, spray head 120 can include nozzle 122 for expelling a cleaning solution (e.g., water, glass cleaner, etc.), and handle 130 can include a liquid reservoir in fluid communication with nozzle 122 for receiving a cleaning solution and button 138 for activating spray head 120 to expel the cleaning solution out nozzle 122 towards an area adjacent to plate 110.

In operation, a cleaning cloth, such as a micro-fiber cloth, may be fitted onto plate 110 and a user may grip handle 130 to use glass cleaning device 100 to clean a surface, such as a windshield. The liquid reservoir can be filled with a cleaning solution, and the user may depress/actuate button 138 to activate the spraying assembly to expel the cleaning solution out nozzle 122 onto the surface to be cleaned (e.g., a windshield) in an area adjacent to plate 110 (e.g., in a path that plate 110 may be moved). The user may then move glass cleaning device 100 such that plate 110 (and the cleaning accessory fitted to plate 110) slides over the surface and the expelled cleaning solution to conveniently and easily clean the surface.

Figure 5:
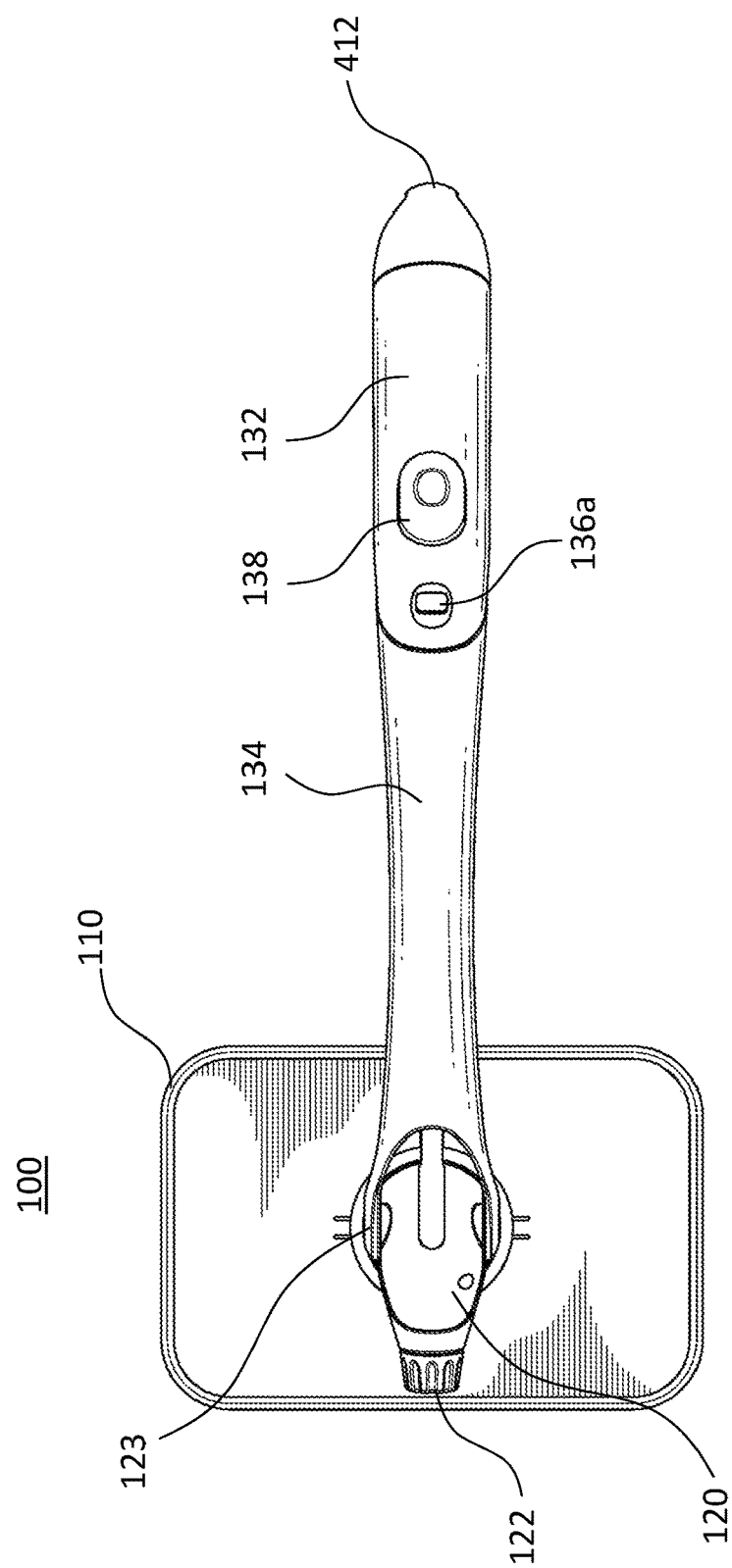
FIG. 5 is a top view of an exemplary glass cleaning device according to an embodiment of the present invention.
Figure 6:
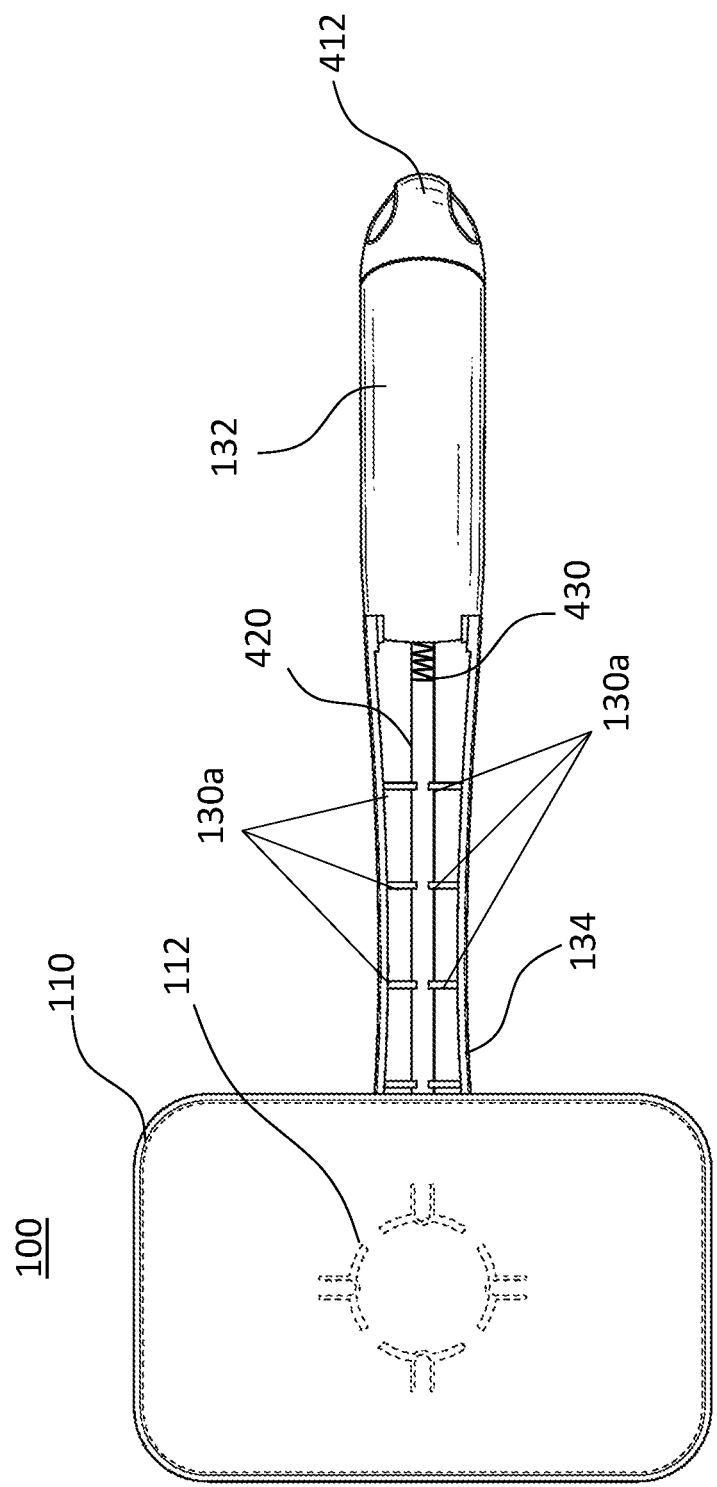
FIG. 6 is a bottom view of an exemplary glass cleaning device according to an embodiment of the present invention.

As shown in FIGS. 1, 5 and 6, plate 110 can be designed and dimensioned to receive/attach/secure a cleaning accessory (e.g., a cloth, rag, pad, sponge, etc.) and can include a flat surface which can provide support and structure to the cleaning accessory. Additionally, plate 110 can include features to facilitate such a cleaning accessory to be attached. For example, plate can include friction pads, hook and loop fasteners, tabs, etc. for receiving a portion of the cleaning accessory and/or securing the cleaning accessory to plate 110. According to one exemplary embodiment, the cleaning accessory may include an elastic member which can bias a perimeter of the cleaning accessory in a closed position to secure the cleaning accessory around plate 110. In operation, a user can manipulate glass cleaning device 100 to slide plate 110 (and the cleaning accessory attached thereto) over the surface to be cleaned. The sliding motion can be used in conjunction with the cleaning solution to further facilitate cleaning of the surface.

Figure 2:
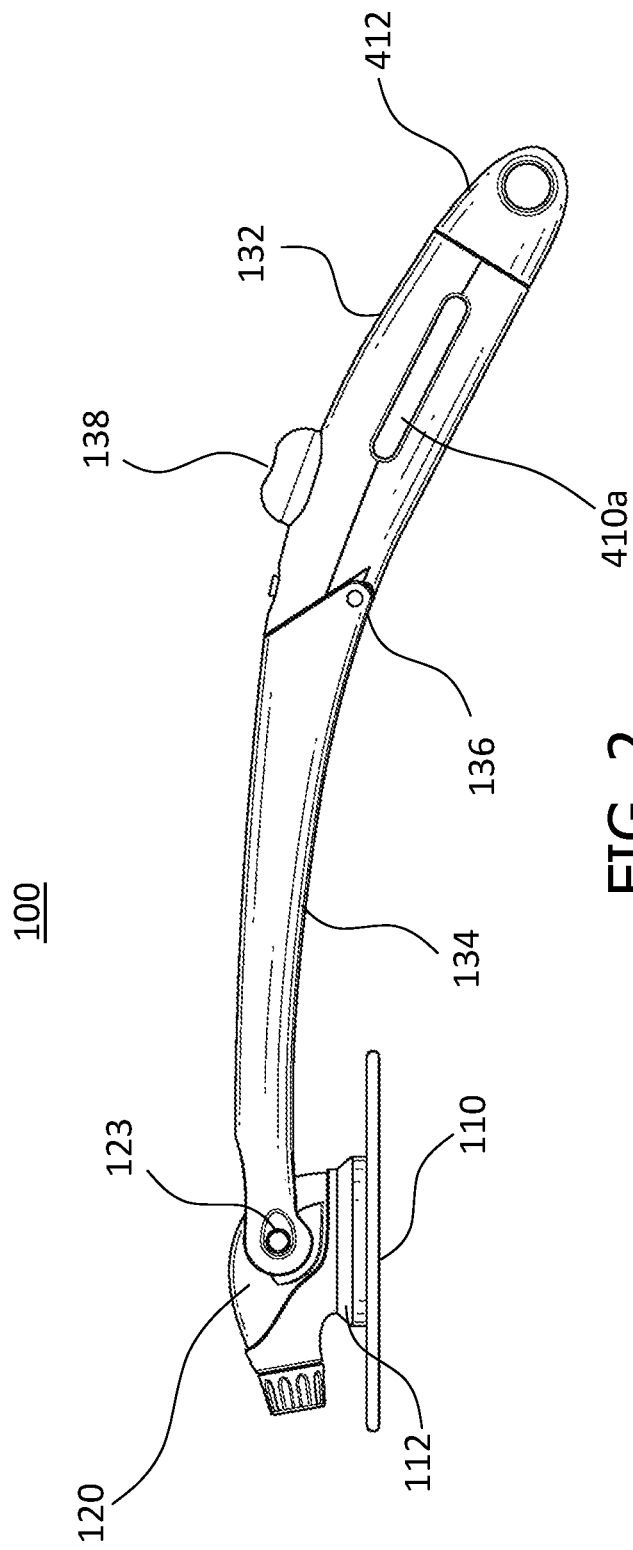
FIG. 2 is a side view of an exemplary glass cleaning device according to an embodiment of the present invention.
Figure 7:
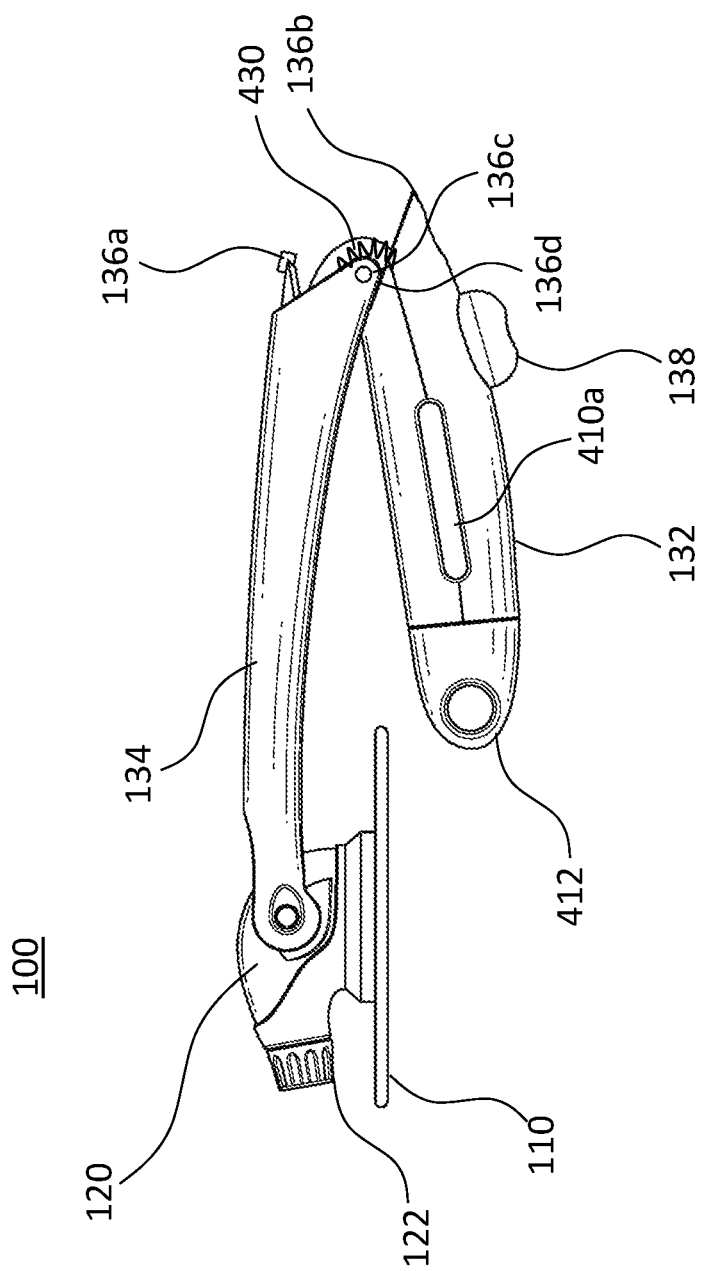
FIG. 7 is a side view of an exemplary glass cleaning device according to an embodiment of the present invention.

As shown in FIGS. 1, 2 and 7, handle 130 can include joint 136, which can pivotally couple proximal portion 132 to distal portion 134 (as described herein, the use of the terms "proximal" and "distal" are relative to a user of the exemplary glass cleaning device, i.e., "proximal" is closer to the user, whereas "distal" is further from the user). Joint 136 can allow proximal portion 132 to pivot relative to distal portion 134 between an extended locked position and a folded position. FIGS. 1, 2, 5, 6, and 8 show handle 130 in the extended locked position and FIG. 7 shows handle 130 in the folded position. For example, handle 130 may be secured in the extended locked position when glass cleaning device 100 is being used to clean a surface, and handle 130 may be in the folded position for easy storage of glass cleaning device 100. Joint 136 can include any type of linkage, coupling, or hinge that can relative pivoting motion between proximal portion 132 and distal portion 134 of handle 130.

According to certain exemplary embodiments, joint 136 can provide releasable locking of proximal portion 132 to distal portion 134 in the extended locked position. For example, joint 136 can include a locking member and a pivoting element. The pivoting element can be any components that can facilitate pivoting between proximal portion 132 and distal portion 134, such as axle 136c. Axle 136c can be received in openings 136d to facilitate pivoting motion between proximal portion 132 and distal portion 134. As shown in FIG. 7, openings 136d can be disposed on projections toward a proximal end of distal portion 134, and axle 136c can be in the form of projections formed at a distal end of proximal portion 132. Alternatively, openings 136d can be disposed on a distal end of proximal portion 132, and axle 136c can be disposed on a proximal end of distal portion 134. According to certain exemplary embodiments, locking member can facilitate releasable locking of proximal portion 132 and distal portion 134 in the locked extended position. Locking member can include locking pin 136a that can be received in an opening 136b to releasably lock proximal portion 132 to distal portion 134. To release the locking of proximal portion 132 and distal portion 134 from the locked extended position, locking pin 136a can be pressed to disengage locking pin 136a from opening 136b to allow proximal portion 132 and distal portion 134 to pivot about axle 136c. Although FIG. 7 shows locking pin 136a disposed on distal portion 134 and opening 136b disposed on proximal portion 132, alternatively, locking pin 136a can be disposed on proximal portion 132 and opening 136b can be disposed on distal portion 134. According to certain exemplary embodiments, locking pin 136a can be a depressable button that can facilitate engagement and disengagement with opening 136b.

As shown in FIGS. 1-3, 5, 7, and 8, glass cleaning device 100 can also include spray head 120, which can be coupled to handle 130 and plate 110. According to certain exemplary embodiments, glass cleaning device 100 can include a conventional spray assembly to store and expel a cleaning solution onto the surface to be cleaned. Spray head 120 can include nozzle 122 through which a cleaning solution can be expelled onto the surface to be cleaned. According to certain exemplary embodiments, nozzle 122 can include nozzles known in the art that may be affixed to spray bottles and the like. For example, nozzle 122 can include a conduit and an opening through which the cleaning solution may be expelled. Nozzle 122 can optionally include an adjustment mechanism (e.g., a rotating body) that adjusts the size of the opening so that the spray of the liquid being expelled from nozzle 122 can be adjusted. Preferably, nozzle 122 is affixed to spray head 120 so that the liquid expelled through nozzle 122 is sprayed onto the surface being cleaned in an area adjacent to plate 110 so that plate 110 can be easily moved over the area onto which the liquid has been expelled.

Figure 3:
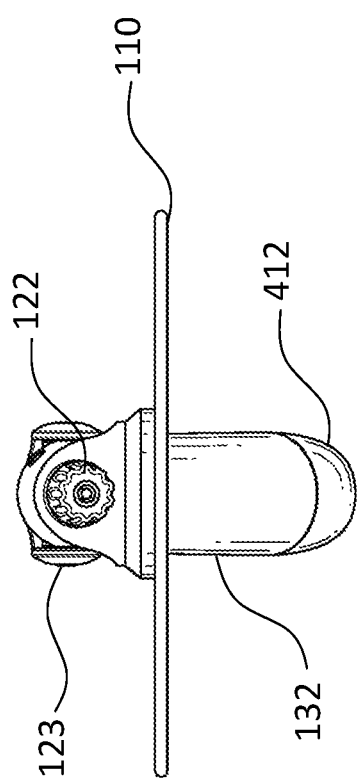
FIG. 3 is a front view of an exemplary glass cleaning device according to an embodiment of the present invention.
Figure 4:
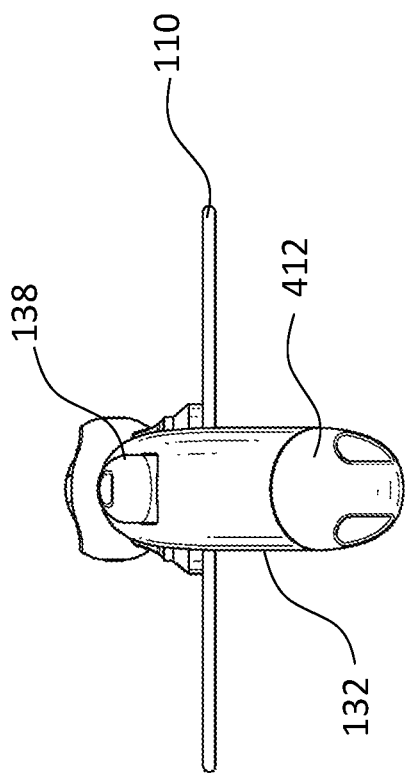
FIG. 4 is a back view of an exemplary glass cleaning device according to an embodiment of the present invention.

As shown in FIGS. 2-3 and 5, spray head 120 can be coupled to handle 130 via pivot 123 and to plate 110 via rotating coupling 112. Pivot 123 can be any type of joint or hinge that provides relative pivoting motion between handle 130 and spray head 120. For example, pivot 123 can include any type of linkage, coupling, hinge that can provide relative pivoting motion between handle 130 and spray head 120. According to one exemplary embodiment, a distal end of handle 130 (e.g., a distal end of distal portion 134) can include two extensions that can include openings or recesses that can receive projections disposed on spray head 120. Alternatively, the two extensions can include projections configured to mate with recesses disposed on spray head 120. According to other exemplary embodiments, pivot 123 can include a mechanism, such as a ball and socket type arrangement, that can provide nearly 360 degrees of range of motion. Optionally, pivot 123 can provide releasable coupling of handle 130 to spray head 120.

As with pivot 123, rotating coupling 112 can allow plate 110 to be rotated relative to spray head 120. According to certain exemplary embodiments, rotating coupling 112 can include a circular track with projections and recesses. The circular track can provide the relative rotatable movement between plate 110 and spray head 120 and projections can cooperate with recesses to releasably secure plate 110 to spray head 120 in various positions. For example, projections and recesses can be circumferentially disposed at known positions around the circular track and as the projections are received in the various recesses, secure plate 110 can be releasably secured to spray head 120 in relative fixed alignment defined by the positioning of the projections and recesses. For example, the recesses and projections and be disposed in increments so that the various angle increments (e.g., 10 degrees, 20 degrees, 30 degrees, 45 degrees, 90 degrees, etc.).

Figure 8:
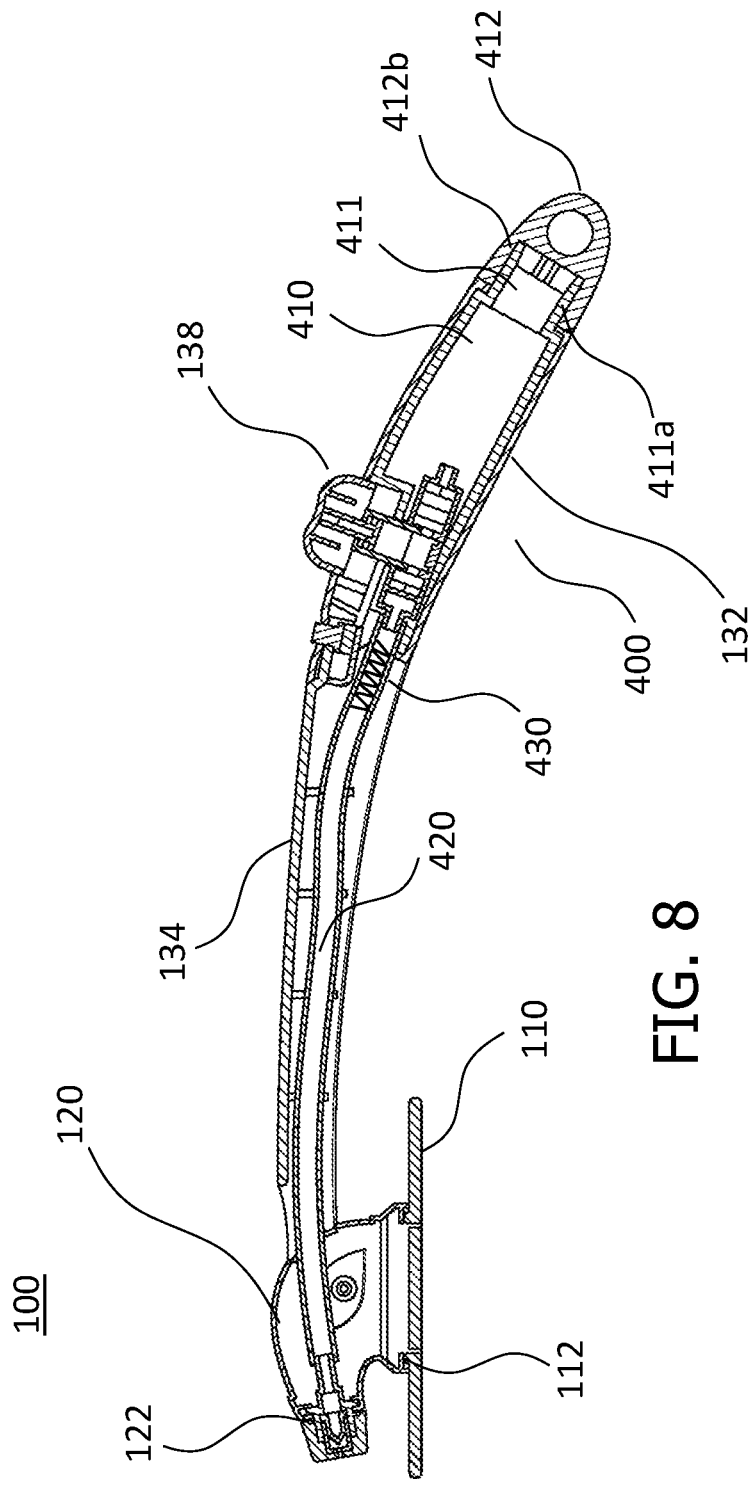
FIG. 8 is a cross-sectional view of an exemplary glass cleaning device according to an embodiment of the present invention.

According to exemplary embodiments and as shown in FIGS. 6-8, glass cleaning device 100 can include spraying assembly 400. Spraying assembly 400 can include fluid reservoir 410, conduit 420, button 138, and nozzle 122. Fluid reservoir 410 can be disposed within proximal portion 132 of handle 130 and can receive and store a liquid cleaning solution such as water, glass cleaner, etc. Fluid reservoir 410 can be in fluid communication, via a lumen of conduit 420, with nozzle 122, so that upon depression/actuation of button 138, the fluid received in reservoir 410 can be expelled via nozzle 122 onto the surface being cleaned. Conduit 420 can extend longitudinally through handle 130 and provide fluid communication between fluid reservoir 410 and nozzle 422. Fluid reservoir 410 can be accessed via opening 411 so that a user may fill/re-fill fluid reservoir 410, and cap 412 may be removably engaged with opening 411 so that fluid reservoir 410 can be sealed after a user has filled/re-filled fluid reservoir 410 with a cleaning solution. Cap 412 may be any other type of closure mechanism known in the art designed to removably and sealingly engage with opening 411. For example, opening 411 can include a threaded end 411a and cap 412 can have complementary threads end 412b designed and dimensioned to releasably engage with threaded end 411a (i.e., threaded end 411a may be a male threaded end, and threaded end 412b may be a female threaded end). Alternatively, cap 412 can be a cork, a snap fitted cap, a lightning-type closure, a pivotally attached snap cap pivotally attached to opening 411, etc. Proximal portion 132 can include window 410a so that a user can view the amount of liquid cleaning solution remaining in fluid reservoir 410. Window 410a may extend along a longitudinal length of fluid reservoir 410 and may be disposed so that any side of fluid reservoir 410 may be visible to the user. For example, window 410a may be located on a top, bottom, right, or left side of fluid reservoir 410.

According to certain exemplary embodiments, handle 130 can include one or more retaining members 130a for securing conduit 420 within a cavity of handle 130. For example, the one or more retaining members can include recesses, openings, clips, etc. to secure conduit 420 therein. Preferably, conduit 420 is made from a flexible material (e.g., a plastic, PVC, silicone, vinyl, rubber, etc.) to allow distal portion 134 and proximal portion 132 to pivot between the locked extended position and the folded position and to allow handle 130 to pivot relative to spray head 120. According to certain exemplary embodiments, conduit 420 can include reinforcing member 430, which can be disposed within the lumen of conduit 420 substantially adjacent to the area where distal portion 134 pivots relative to proximal portion 132 to ensure that conduit 420 does not collapse and/or is not pinched so as to prevent fluid to flow from fluid reservoir 410 to nozzle 122. Reinforcing member 430 can include any structure or component that can maintain the structural integrity of conduit 420 while providing fluid communication within the conduit. For example, reinforcing member 430 can include a reinforced tube, a spring, etc. Optionally, conduit 420 can include a further reinforcing member within conduit 420 adjacent to the area where distal portion 134 pivots relative to spray head 122 to ensure that conduit 420 does not collapse and/or is not pinched so as to prevent fluid to flow from fluid reservoir 410 to nozzle 122. In operation, a user can activate spraying assembly 400 by depressing/actuating button 138. This can actuate a piston or other pump, to force liquid from reservoir 410 through conduit 420 to be expelled via nozzle 122. Spraying assembly 400 can also include one or more valves (e.g., one-way valves, etc.) to prevent air from entering conduit 420 after the liquid has been expelled and/or to prevent fluid urged into conduit 420 from flowing back into fluid reservoir 400.

The embodiments and examples shown above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of the disclosure. For a better understanding of the disclosure, reference should be had to the accompanying drawings and descriptive matter in which there is illustrated exemplary embodiments of the present invention.

What is claimed is:

1. A glass cleaning device, comprising:
    a handle having a distal portion and a proximal portion, the proximal portion pivotally coupled to the distal portion so that the proximal portion can pivot between an extended position and a folded position;
    a spray head having a nozzle in fluid communication with a fluid reservoir, the fluid reservoir being disposed with the proximal portion of the handle and the nozzle being pivotably coupled to the distal portion of the handle;
    a button to activate and expel a cleaning solution from the nozzle, the button being disposed on the proximal portion of the handle; and
    a plate coupled to the spray head, the nozzle being spaced from the plate and being angled such that the cleaning solution is expelled from the nozzle onto a treatment surface in an area laterally adjacent to the plate.

2. The glass cleaning device of claim 1, further comprising a joint at which the proximal portion and the distal portion are pivotally coupled.

3. The glass cleaning device of claim 2, wherein the joint includes an axle and a locking pin, the locking pin being receivable in an opening to provide releasable locking of the handle in the extended position.

4. The glass cleaning device of claim 2, further comprising a flexible conduit extending through the handle from the fluid reservoir to the spray head, the flexible conduit including a lumen to provide the fluid communication between the nozzle and the fluid reservoir.

5. The glass cleaning device of claim 4, wherein the handle includes a plurality of retaining members configured to secure and position the flexible conduit in the handle.

6. The glass cleaning device of claim 4, further comprising a reinforcing member disposed in the lumen of the flexible conduit adjacent to the joint to prevent the lumen from collapsing when the handle is in the folded position.

7. The glass cleaning device of claim 6, wherein the reinforcing member includes a spring.

8. The glass cleaning device of claim 1, wherein the plate is rotatably coupled to the spray head.

9. The glass cleaning device of claim 8, wherein the spray head includes at least one recess and the plate includes a spring-biased projection that engages with the at least one recess to allow the plate to be releasably secured, relative to the spray head, in a plurality of positions.

10. A glass cleaning device, comprising:
a handle including a linkage providing a pivoting connection between a distal portion of the handle and a proximal portion of the handle, the pivoting connection allowing the distal portion to be pivoted relative to the proximal portion between an extended position and a folded position;
a nozzle;
a fluid reservoir;
a flexible conduit having a lumen extending through the handle to provide fluid communication between the nozzle and the fluid reservoir;
a reinforcing member disposed within the lumen adjacent to the linkage to prevent the lumen from collapsing when the handle is in the folded position;
a button to activate and expel a cleaning solution from the nozzle disposed on the proximal portion of the handle; and,
a plate coupled to the nozzle, the nozzle being spaced from the plate and being angled such that the cleaning solution is expelled from the nozzle onto a treatment surface in an area laterally adjacent to the plate.

11. The glass cleaning device of claim 10, wherein the linkage includes an axle and a locking pin.

12. The glass cleaning device of claim 11, wherein, in the extended position, the locking pin is received in an opening to releasably secure the handle in the extended position.

13. The glass cleaning device of claim 12, wherein the locking pin is depressable to disengage the locking pin from the opening to allow the proximal portion to pivot about the axle relative to the distal portion.

14. The glass cleaning device of claim 10, wherein the a plate is designed and dimensioned to receive a cleaning accessory.

15. The glass cleaning device of claim 14, further comprising a spray head, wherein the plate is rotatably coupled to the spray head.

16. The glass cleaning device of claim 15, wherein the spray head includes at least one recess and the plate includes a spring-biased projection that engages with the at least one recess to allow the plate to be releasably secured, relative to the spray head, in a plurality of positions.

17. The glass cleaning device of claim 10, wherein the reinforcing member includes a spring.

18. The glass cleaning device of claim 10, wherein the nozzle is positioned such that upon activation of the nozzle via the button, liquid contained within the fluid reservoir is urged to an area adjacent the plate.

19. The glass cleaning device of claim 10, wherein the handle includes a plurality of retaining members configured to secure and position the flexible conduit in the handle.

* * * * *